(12) United States Patent
Dierdorf et al.

(10) Patent No.: US 8,057,858 B2
(45) Date of Patent: Nov. 15, 2011

(54) METHOD FOR IMPROVING THE CORROSION RESISTANCE AND LIGHTFASTNESS OF PAINTED ALUMINUM OXIDE LAYERS

(75) Inventors: Andreas Dierdorf, Hofheim (DE); Stefan Brand, Hirschberg-Leutershausen (DE); Hubert Liebe, Wiesbaden (DE); Frank Osterod, Liederbach (DE); Oliver Eich, Basel (CH); Mark Jozefowicz, Matthews, NC (US)

(73) Assignee: Clariant Finance (BVI) Limited, Tortola (GA)

( * ) Notice: Subject to any disclaimer, the term of this patent is extended or adjusted under 35 U.S.C. 154(b) by 217 days.

(21) Appl. No.: 12/084,191

(22) PCT Filed: Oct. 13, 2006

(86) PCT No.: PCT/EP2006/009907
§ 371 (c)(1),
(2), (4) Date: Mar. 24, 2009

(87) PCT Pub. No.: WO2007/048513
PCT Pub. Date: May 3, 2007

(65) Prior Publication Data
US 2009/0220806 A1  Sep. 3, 2009

(30) Foreign Application Priority Data
Oct. 27, 2005 (DE) .......................... 10 2005 051 755

(51) Int. Cl.
*B05D 3/02* (2006.01)
(52) U.S. Cl. .................. 427/372.2; 427/385.5; 427/387; 427/388.1

(58) Field of Classification Search .................. None
See application file for complete search history.

(56) References Cited

U.S. PATENT DOCUMENTS

| | | | | |
|---|---|---|---|---|
| 3,773,631 A | * | 11/1973 | Immel et al. .................. 205/173 |
| 3,787,295 A | * | 1/1974 | Endinger et al. ............... 205/173 |
| 2003/0164113 A1 | * | 9/2003 | Suzuki ....................... 106/18.32 |
| 2007/0190308 A1 | | 8/2007 | Brand et al. |
| 2007/0196672 A1 | | 8/2007 | Brand et al. |
| 2008/0014461 A1 | * | 1/2008 | Brand et al. .................. 428/642 |
| 2008/0107894 A1 | | 5/2008 | Brand et al. |
| 2008/0118651 A1 | | 5/2008 | Brand et al. |
| 2009/0286086 A1 | | 11/2009 | Dierdorf et al. |

FOREIGN PATENT DOCUMENTS

| | | |
|---|---|---|
| EP | 0936288 | 8/1999 |
| EP | 1230444 | 8/2002 |
| JP | 2001172715 | 6/2001 |
| WO | WO 2005/085374 | 9/2005 |
| WO | WO2006050813 | * 5/2006 |

OTHER PUBLICATIONS

Abstracts and partial machine translation of JP 2001-172795, Jun. 2001.*
Moller et al, Solar Energy Materials and Solar Cells, 54, pp. 397-403, 1998.*
PCT International Search Report for PCT/EP2006/009707, mailed Jul. 26, 2009.
English Translation of PCT International Preliminary Report on Patentability for PCT/EP2006/009907, mailed Jun. 11, 2008.
English Abstract for JP 2001172795, Jun. 26, 2001.

* cited by examiner

*Primary Examiner* — Erma Cameron
(74) *Attorney, Agent, or Firm* — Anthony A. Bisulca

(57) ABSTRACT

A method for producing corrosion-resistant, painted oxide layers on aluminum or aluminum alloys. According to the method, a polysilazane solution is applied to a dry oxide layer that is painted with a water-soluble, anionic color, and the coating is then hardened at a temperature ranging from 40 to 150° C.

5 Claims, No Drawings

METHOD FOR IMPROVING THE CORROSION RESISTANCE AND LIGHTFASTNESS OF PAINTED ALUMINUM OXIDE LAYERS

Structures, articles or parts made of aluminum or aluminum alloys which are provided with a protective oxide layer, in particular an oxide layer produced galvanically by anodization, are nowadays used increasingly in engineering and construction, e.g. as a constituent or/and for decorating buildings, means of transport, or for basic commodities or objets d'art. For the esthetic design of such structures, articles or parts, the latter, or their oxide layers, are usually colored. It is therefore desirable for the colored layers to have high corrosion and light resistances and to retain their colored design for as long as possible.

The protective oxide layer is frequently produced here by anodization. Depending on the intended use of the desired component, various anodization conditions are known. All processes have in common, however, that a minimum layer thickness of aluminum oxide is necessary in order to guarantee appropriate protection against corrosion. Inferior quality with respect to protection against corrosion, in addition to the destruction of the surface, also has the disadvantage that the aluminum surface is unusable for decorative purposes, since visual impairment is always the consequence of such an undesired process. In addition to natural corrosion, such processes in particular occur when chemically aggressive substances reach the surface. This applies equally for colored and uncolored surfaces.

For inorganic, organic and electrolytic coloring of these oxide layers on aluminum or aluminum alloys, colorants of various shades are known, and the oxide layers colored therewith can be densified in a manner customary per se, e.g. using hot water. The colorings obtainable in each case can, however, have greatly different light and corrosion fastnesses, particularly after fairly long insolation or exposure to aggressive substances, such that often undesired impairment or even deterioration of the surface quality and in particular of the color impression can occur. In particular, light color shades of many colorants are not adequately stable to light.

It is thus desirable to achieve an improved resistance to corrosion in combination with colorings with better light fastnesses and also to take the light fastness of various colorings to an altogether higher level, i.e., for example, to take colorings with colorants which produce fairly weak light fastnesses per se to the level of those colorings with respect to light fastness which are obtainable with colorants which afford very high light fastnesses per se. This applies in particular for light color shades. As a result of densification using certain densifying agents, e.g. based on nickel, at room temperature with a subsequent hot-dip, in some cases a certain improvement in the light fastness can be achieved which, however, in many cases is still inadequate, particularly for articles which are intended for the external architecture, that is are exposed to solar irradiation for a very long time.

It has now surprisingly been found that an improved resistance to corrosion with simultaneously improved light fastness of the colored layers can be obtained if the colored aluminum oxide layers are coated with an inorganic lacquer based on polysilazane. In this manner, it is possible to reduce the aluminum oxide layer thickness or the amount of colorant in this layer without impairment of the quality of the layers occurring.

The present invention thus relates to a process for the preparation of corrosion-resistant, colored oxide layers on aluminum or aluminum alloys, in which a polysilazane solution is applied to a dry oxide layer colored with a water-soluble, anionic colorant, and the coating is subsequently cured at a temperature in the range from 40 to 150° C. By means of the process according to the invention, it is possible to produce colored aluminum oxide layers having good corrosion resistance, which are simultaneously distinguished by high light and UV stability. A further advantage of the process according to the invention is that the oxide layers can be reduced in comparison to conventional processes without a decrease in quality occurring. Without the polysilazane treatment, these reduced layer thicknesses of the anodized, colored aluminum would not be sufficiently resistant to UV radiation and corrosive attack. By this type of treatment, less UV stable colorants or colorant systems can also be used which were hitherto not suitable for external use. In particular, it is possible by this procedure to widen the range of color shades of a colorant. Light shades which are applied according to the known processes often show inadequate light fastness. Thus, in the process described here, in particular with thinly anodized, briefly colored samples, which thus show a light color shade, an improvement in the light fastness occurs. At the same time, the protection against corrosion is also improved.

The colored oxide layers on aluminum or aluminum alloys are produced by dipping of the anodically produced, porous aluminum oxide layer in an aqueous solution of colorants and subsequent densification of the colored layers.

As colorants, generally those can be employed which are known for the coloring of anodically produced aluminum oxide layers or usable therefor. In addition and in particular, those colorants are now also employable which only have a weak or reduced light fastness and thus were previously unable to be employed for external use in the architectural field.

In particular, colorants and color shades are now also employable which in the case of conventional coloring of anodized aluminum have a light fastness of at most 4, since with the aid of the process according to the invention an increase by at least 3 light fastness grades (according to ISO directive No. 2335) of the colored layers is achieved.

The anionic colorants or metal salts can be present in the form of the free acids or preferably in the form of water-soluble or water-insoluble salts, e.g. as alkali metal, alkaline earth metal and/or ammonium salts. The process is that of adsorptive coloring. This process can be carried out by various types of surface treatment (spraying, brushing or immersing) using the solutions of these colorants. Printing pastes can also be prepared using these colorants, which are then applied by the screen printing process or ink-jet process.

Furthermore, the aluminum oxide layers, which were produced by anodic oxidation, can also be prepared by metal salts according to the principle of the electrolytic coloring process. Here, the anodized aluminum surface is colored after the anodization in a metal salt bath by applying an electrical AC voltage. The Sandocolor or Colinal process serves as an example.

A further possibility is the combination coloring process, in which an electrolytically colored oxide layer is first produced according to the process described above by means of metal salt solution. In a second step, this electrolytic coloring is dyed in a dye bath of dissolved organic colorants or a metal salt solution. The Sandalor process serves as an example.

This application also relates to colorings on anodized aluminum surfaces which have been dyed according to the principle of color anodization or hard anodization. Here, a process is involved in which the color-imparting substances are present in anodization pools and these substances are incorporated into the aluminum oxide layer during the anodic oxidation. An example is the Permalux process or the Huwyler process.

The oxide layers to be colored are customarily artificially produced oxide layers on aluminum or aluminum alloys.

Suitable aluminum alloys are principally those in which the aluminum content predominates, especially alloys with magnesium, silicon, zinc and/or copper, e.g. Al/Mg, Al/Si, Al/Mg/Si, Al/Zn/Mg, Al/Cu/Mg and Al/Zn/Mg/Cu, preferably those in which the aluminum content makes up at least 90 percent by weight; the magnesium content is preferably $\leq 6$ percent by weight; the silicon content is preferably $\leq 6$ percent by weight; the zinc content is preferably $\leq 10$ percent by weight; the copper content is advantageously $\leq 2$ percent by weight, preferably $\leq 0.2$ percent by weight.

The oxide layers formed on the metallic aluminum or on the aluminum alloys can have been produced by chemical oxidation or preferably galvanically by anodic oxidation. The advantage of the process described here lies in the possibility of being able to use thin oxide layers. The processes described up to now show, in these thin oxide layers, only a lacking stability to a corrosive attack and low light fastness of the colored surfaces, in particular with light color shades. The anodic oxidation of the aluminum or of the aluminum alloy for passivation and formation of a porous layer can be carried out according to known methods, using direct current and/or alternating current, and using suitable electrolyte baths in each case, e.g. with addition of sulfuric acid, oxalic acid, chromic acid, citric acid or combinations of oxalic acid and chromic acid or sulfuric acid and oxalic acid. Such anodizing processes are known in industry, e.g. the DC process (direct current; sulfuric acid), the DCX process (direct current; sulfuric acid with addition of oxalic acid), the DX process (direct current; oxalic acid), the DX process with addition of chromic acid, the AX process (alternating current; oxalic acid), the AX-DX process (oxalic acid; first alternating current then direct current), the AS process (alternating current; sulfuric acid) and the chromic acid process (direct current; chromic acid). The voltages are, for example, in the range from 5 to 80 volts, preferably 8 to 50 volts; the temperatures, for example, are in the range from 0 to 50° C.; the current density on the anode is, for example, in the range from 0.3 to 5 $A/dm^2$, preferably 0.5 to 4 $A/dm^2$, in general current densities of 1-2 $A/dm^2$ already being suitable in order to produce a porous oxide layer; at higher voltages and current densities, e.g. in the range from 100 to 150 volts and $\geq 2$ $A/dm^2$, particularly 2 to 3 $A/dm^2$, and at temperatures up to 20° C., particularly hard and finely porous oxide layers can be produced, e.g. according to the "Ematal" process with oxalic acid in the presence of titanium and zirconium salts. In the preparation of oxide layers which are subsequently colored electrolytically or adsorptively directly with a colorant, according to a procedure which is preferred and customary per se in practice the voltage is in the range from 12 to 25 volts; the current density here is preferably 1 to 2 $A/dm^2$. These anodizing processes are generally known in industry and are also described in detail in the technical literature, e.g. in Ullmann's "Enzyklopädie der Technischen Chemie" [Encyclopedia of industrial chemistry], 4th edition, volume 12, pages 196 to 198, or in the Sandoz brochures "Sanodal®" (Sandoz AG, Basle, Switzerland, Publication No. 9083.00.89) or "Ratgeber für das Adsorptive Färben von Anodisiertem Aluminium" [Guide for the adsorptive coloring of anodized aluminum] (Sandoz, Publication No. 9122.00.80).

The layer thickness of the porous oxide layer is advantageously in the range from 5 to 25 µm, preferably 8 to 15 µm. If the anodized aluminum or the anodized aluminum alloy has been stored for a short time before coloring (e.g. 1 week or less), it is advantageous to wet and/or to activate the substrate before coloring, e.g. by treatment with a nonreducing, aqueous mineral acid, e.g. with sulfuric acid, hydrogen peroxide or nitric acid.

Coloring is expediently carried out at temperatures of 15-98° C., or more advantageously at temperatures between 18 to 70° C., particularly preferably 20 to 60° C. The pH of the color liquor is, for example, in the weakly acidic to weakly basic range, for example in the pH range from 3 to 8, weakly acidic to almost neutral conditions being preferred, in particular in the pH range from 3 to 7. The colorant concentration and the coloring period can be very greatly varied, depending on the substrate and desired tinctorial effect. Suitable colorant concentrations, for example, are in the range from 0.01 to 50 g/l, advantageously 0.05 to 30 g/l, in particular 0.1 to 10 g/l. The coloring period can be, for example, in the range from 10 seconds to 1.5 hours, advantageously 1 to 90 minutes, preferably 5 to 60 minutes.

The colorings thus obtained can then be densified or subjected directly to the coating procedure. Before densifying, the colorings are advantageously rinsed with water.

The densification can be carried out by means of all procedures and densification agents known from the literature. The following are advantageous: steam densification, hot water densification with and without a coating preventer, mid-temperature sealing with additives (coating preventers) and/or metal salts, nickel hot densification or cold densification with and without subsequent hot water treatment. In the case of steam densification, the aluminum parts are introduced into a container filled with steam, the pressure conditions being defined. A pretreatment by means of metal salts can moreover be carried out.

In the case of hot densification, for example, the aluminum parts are densified in hot water with addition of additives for coating prevention (Anodal SH-1) at a temperature of 96-100° C.

In the case of the mid-temperature densification method the sealing is carried out, for example, in water at temperatures between 70 and 90° C. and with addition of densification-accelerating and/or coating-preventing additives.

In the case of cold densification, for example, an aqueous solution of nickel acetate, nickel fluoride, an alkali metal fluoride (advantageously sodium fluoride), ammonium fluoride, densification aids, metal salts (e.g. cobalt compounds) and/or aids such as, for example, anionic surfactants are employed. The aqueous solutions of such mixtures are employed for densifying at room temperature or up to 30° C.

Furthermore, combinations of the processes addressed above can also be employed in order, for example, to improve the surface quality. Inter alia, a presealing can be started, for example, at 70° C. in an aqueous solution comprising nickel acetate, and an anionic surfactant (nickel heat sealing; Sealsalz ASL). Another possibility for this presealing is the use of a cold sealing. This presealing is subsequently completed by a hot dip in hot water without or with an addition of a coating preventer for hot water densification (Anodal SH-1) or of an aid for the mid-temperature sealing (Anodal SH-2) (two-stage densification).

Following this densification, the densified anodized aluminum is dried. Here, simple wiping techniques or alternatively hot air blowers up to a temperature range of 110° C. can be employed. Other drying processes are likewise possible here. Drying in air is also carried out.

Following the densification, coating with a polysilazane solution takes place. This coating can also be applied to the unsealed aluminum surface after the anodization by the color-imparting process.

According to the invention, for the coating polysilazane solutions are used comprising a solvent, a catalyst and a polysilazane or a mixture of polysilazanes of the formula 1

$$-(SiR'R''-NR''')_n-\quad (1)$$

Herein, R', R", R'" are identical or different and independently of one another represent hydrogen or an optionally substituted alkyl, aryl or (trialkoxysilyl)alkyl radical, where n is an integer and n is calculated such that the polysilazane has a number average molecular weight of 150 to 150 000 g/mol.

Particularly suitable here are those polysilazanes in which R', R", R'" independently of one another represent a radical from the group consisting of hydrogen, methyl, ethyl, propyl, isopropyl, butyl, isobutyl, tert-butyl, phenyl, vinyl or 3-(tri-ethoxysilyl)-propyl, 3-(trimethoxysilylpropyl).

In a preferred embodiment, perhydropolysilazanes of the formula 2 are used for the coating according to the invention.

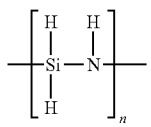

(2)

Polysilazanes or polysilazane solutions employable according to the invention are described, for example, in PCT/EP 2005/011 425, to which reference is expressly made hereby.

Further constituents of the polysilazane solution can be additives, which, for example, influence viscosity of the formulation, substrate wetting, film formation or waste air behavior, and, if appropriate, inorganic nanoparticles such as, for example, $SiO_2$, $TiO_2$, ZnO, $ZrO_2$, indium-tin oxide (ITO) or $Al_2O_3$. UV stabilizers such as, for example, HALS compounds can also be employed.

The curing of the polysilazane coating is preferably carried out at an oven temperature of 40 to 150° C., preferably 50 to 120° C., particularly preferably 60 to 110° C. The drying time is customarily 10 min to 12 h, depending on the layer thickness.

Apart from curing by conventional drying, the use of drying radiators based on UV, IR or NIR technology is also possible.

The polysilazane coatings applied and cured in this way have a layer thickness of 1 to 10 μm, in particular of 2 to 5 μm.

By means of the process according to the invention, it is possible to improve the light fastness and corrosion resistance of the colored surfaces considerably, which can be observed in particular with light shades or colorants having low light fastness.

EXAMPLES

The light fastness can be determined according to ISO directives, e.g. according to ISO directive No. 2135-1984 by dry exposure of a sample in exposure cycles of 100 hours standard light exposure each in an Atlas-Weather-O-meter 65 WRC which is provided with a xenon arc lamp, or according to ISO directive No. 105 B02 (USA) by dry exposure of a sample in exposure cycles of 100 hours standard light exposure each in an Atlas-Weather-O-meter Ci 35 A which is provided with a xenon arc lamp, and comparison of the exposed samples with a grading pattern, for example, of light fastness grade=6 of the blue scale (corresponding approximately to grade 3 according to the gray scale), or directly with the blue scale pattern of grade 6 of the light fastness value or of the light fastness grade of a colorant. If a light fastness value corresponding to grade 6 according to the blue scale is achieved only after 2 exposure cycles, the pattern is assessed as having a light fastness grade=7; if this point is reached only after 4 cycles, a light fastness grade of 8 is assigned to the pattern, and so on, as presented in Table 1 below.

TABLE 1

| Exposure cycle | Exposure time Ci 35 A | Light fastness grade |
|---|---|---|
| 1 | 100 hours | 1-6 |
| 2 | 200 hours | 7 |
| 4 | 400 hours | 8 |
| 8 | 800 hours | 9 |
| 16 | 1600 hours | 10 |

The corrosion resistance can be determined according to the test standard ISO 3770 by means of CASS test (Copper Accelerated Salt Spray Test). For this purpose, the coated and, for comparison, the uncoated aluminum parts, which beforehand were anodized, colored or uncolored and sealed or unsealed, are sprayed according to the test standard with a copper chloride-sodium chloride solution at pH 3.1-3.3 and a temperature of 50+/−2° C. for at least 24 h. Subsequently, the parts are cleaned and subjected to assessment according to ISO 1462. Here, a considerable decrease in the corrosion errors is to be observed in the polysilazane-coated samples, in particular a reduction in the hole number, crack and blister formation.

In the following examples, the parts are parts by weight and the percentages percentages by weight; the temperatures are stated in degrees Celsius; the colorants are employed in customary commercial form.

Example 1

Reference A

A degreased and deoxidized sheet of pure aluminum is anodically oxidized in an aqueous solution which contains, in 100 parts, 16.5-22 parts of sulfuric acid and 0.5-1.5 parts of aluminum, at a temperature of 17 to 21° C., at a voltage of 12 to 20 volts DC, a density of 1.0-1.8 A/dm², for 40 to 50 minutes. An oxide layer of about 20 to 24 μm thickness is formed here. After rinsing with water, the anodized aluminum sheet is colored for 30 minutes at 60° C. and a pH of 5.6 with Aluminium Orange G (Clariant, concentration: 3 g/l).

Subsequently, the colored sheet is rinsed with water and densified using Anodal SH-1 (Clariant, concentration: 2 ml/l) at 980 for 50 min.

Example 2

Reference B

A degreased and deoxidized sheet of pure aluminum is anodically oxidized in an aqueous solution which, in 100 parts, contains 16.5-22 parts of sulfuric acid and 0.5-1.5 parts of aluminum sulfate, at a temperature of 17 to 21° C., at a voltage of 12 to 20 volts DC, a density of 1.0-1.8 A/dm², for 30 minutes. An oxide layer of about 12-14 μm thickness is formed here. After rinsing with water, the anodized aluminum sheet is colored for 20 minutes at 60° C. and a pH of 5.6 with Aluminium Orange G (Clariant, concentration: 3 g/l).

Subsequently, the colored sheet is rinsed with water and densified with Anodal SH-1 (Clariant, concentration: 2 ml/l) at 100° C. for 60 or 30 min.

Example 3

Analogously to example 1, a further sample is prepared, which after densification and drying is provided with a polysilazane layer. For this, the colored, anodized aluminum sheet is then dipped for a few seconds in a solution of NL 120 A-20® (Clariant) and carefully taken out. After briefly draining, the sample is dried at 120° C. for 3 h.

Example 4

Analogously to example 1, a further sample is prepared, which after densification and drying is provided with a polysilazane layer. For this, a mixture of a nanoparticulate ZnO dispersion (20 mol %) in dibutyl ether and a polysilazane solution NL 120 A-20® (20 mol %) in dibutyl ether in the ratio 1:1 are prepared. The dried, colored, anodized aluminum sheet is then dipped for a few seconds in the above mixture and carefully taken out. After briefly draining, the sample is dried at 110° C. for 3 hours.

Example 5

Reduced Anodized AL Thickness, PHPS

Analogously to example 2, a further sample is prepared, which after densification and drying is provided with a polysilazane layer. For this, the colored, anodized aluminum sheet is then dipped for a few seconds in a solution of NL 120 A-20 (Clariant) and carefully taken out. After briefly draining, the sample is dried at 120° C. for 2 h.

Example 6

Analogously to example 2, a further sample is prepared, which after densification and drying is provided with a polysilazane layer. For this, a mixture of a nanoparticulate ZnO dispersion (20 mol %) in dibutyl ether and a polysilazane solution NL 120 A-20® (20 mol %) in dibutyl ether in the ratio 1:1 is prepared. The dried, colored, anodized aluminum sheet is then dipped for a few seconds in the above mixture and carefully taken out. After briefly draining, the sample is dried at 110° C. for 3 hours.

Example 7

Analogously to example 2, a further sample is prepared, which after densification and drying is provided with a polysilazane layer. For this, the colored, anodized aluminum sheet is then dipped for a few seconds in a solution of NP 110-10® (Clariant) and carefully taken out. After briefly draining, the sample is dried at 100° C. for 3 h.

| Example | Anodized AL thickness (μm) | System Corrosion test | Light fastness, 100 h (Atlas CI35) |
|---|---|---|---|
| B 1 (Ref. A) | 20-24 | without | 3 |
| B 2 (Ref. B) | 12-14 | without | 2 |
| B 3 | 20-24 | NL-120A-20 | >6 |
| B 4 | 20-24 | NL-120A-20/ZnO | >6 |
| B5 | 12-14 | NL-120A-20 | >6 |
| B6 | 12-14 | NL-120A-20/ZnO | >6 |
| B7 | 12-14 | NP-120A-20 | >6 |

The invention claimed is:

1. A process for the preparation of a corrosion-resistant, colored oxide layer on aluminum or an aluminum alloy comprising the steps of applying a polysilazane solution to a dry oxide layer colored with a water-soluble, anionic colorant to form a coating and curing the coating at a temperature in the range from 40 to 150° C., wherein the polysilazane solution comprises a solvent, a catalyst and a polysilazane or a mixture of polysilazanes of the formula 1

$$—(SiR'R''—NR''')_n \qquad (1)$$

where R', R'', R''' are identical or different and independently of one another are hydrogen or an optionally substituted alkyl, aryl, vinyl or (trialkoxysilyl)alkyl radical, where n is an integer and n is calculated such that the polysilazane or mixture of polysilazanes has a number average molecular weight of 150 to 150 000 g/mol, wherein the oxide layer has a thickness in the range from 5 to 30 μm before the curing step, wherein the coating has a layer thickness of 1 to 10 μm after the curing step.

2. The process as claimed in claim 1, wherein the oxide layer is produced by anodization.

3. The process as claimed in claim 1, wherein the polysilazane solution contains at least compound selected from group consisting of additives for influencing the viscosity, substrate wetting, film formation, and combinations thereof, and, optionally, at least one compound selected from the group consisting of inorganic nanoparticles, UV stabilizers and mixtures thereof.

4. The process as claimed in claim 1, wherein with a colorant which has a light fastness of at most 4, an improvement in the light fastness by at least 3 light fastness grades, as measured according to ISO directive No. 2135-1984, is achieved by the process.

5. A corrosion-resistant colored oxide layer on aluminum or an aluminum alloy made in accordance with the process of claim 1.

* * * * *